United States Patent
Bhusri et al.

(10) Patent No.: US 12,205,099 B2
(45) Date of Patent: Jan. 21, 2025

(54) SOCIAL MEDIA ACCOUNT-LINKING CHECKOUT

(71) Applicant: Capital One Services, LLC, McLean, VA (US)

(72) Inventors: Nimma Bhusri, New York, NY (US); Ljubica Chatman, New York, NY (US); Lukiih Cuan, Washington, DC (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 635 days.

(21) Appl. No.: 16/999,371

(22) Filed: Aug. 21, 2020

(65) Prior Publication Data

US 2021/0110373 A1  Apr. 15, 2021

Related U.S. Application Data

(63) Continuation of application No. 16/600,920, filed on Oct. 14, 2019, now abandoned.

(51) Int. Cl.
| | |
|---|---|
| *G06Q 20/22* | (2012.01) |
| *G06Q 20/38* | (2012.01) |
| *G06Q 20/40* | (2012.01) |
| *G06Q 50/00* | (2024.01) |

(52) U.S. Cl.
CPC ......... *G06Q 20/227* (2013.01); *G06Q 20/382* (2013.01); *G06Q 20/4014* (2013.01); *G06Q 50/01* (2013.01)

(58) Field of Classification Search
CPC ............... G06Q 20/227; G06Q 20/382; G06Q 20/4014; G06Q 50/01
See application file for complete search history.

(56) References Cited

U.S. PATENT DOCUMENTS

| | | | | |
|---|---|---|---|---|
| 8,682,802 | B1 * | 3/2014 | Kannanari | G06Q 20/3274 705/64 |
| 9,231,939 | B1 * | 1/2016 | Morrison | H04L 63/0815 |
| 9,940,653 | B1 * | 4/2018 | Rygaard | G06Q 30/0641 |

(Continued)

OTHER PUBLICATIONS

Amazon, Login with Amazon Developer Guide for Websites, Dec. 16, 2015.

*Primary Examiner* — Ari Shahabi
*Assistant Examiner* — Zesheng Xiao
(74) *Attorney, Agent, or Firm* — TROUTMAN PEPPER HAMILTON SANDERS LLP; Christopher J. Forstner; John A. Morrissett

(57) ABSTRACT

Systems and method for linking a social media handle to a financial account and providing a payment handle are disclosed. The payment handle is a unique identifier that allows a social media user to enter the payment handle in a checkout page within the social media ecosystem to authorize payment for goods or services. An account provider system can create a first payment handle to associate with a first social media system and a second payment handle to associate with a second social media system. The payment handle can be generated according to a list of preferred goods, merchant lists, or maximum transaction amounts. Rather than entering a credit card number, expiration date, address, and other data into a conventional checkout page, the system can enable a user to checkout simply by entering the payment handle and hitting "submit" (or similar).

20 Claims, 8 Drawing Sheets

(56) References Cited

U.S. PATENT DOCUMENTS

| | | | |
|---|---|---|---|
| 11,676,070 B1* | 6/2023 | Snyder | G06F 16/2433 |
| | | | 706/11 |
| 2007/0107016 A1* | 5/2007 | Angel | H04N 21/47202 |
| | | | 725/112 |
| 2008/0235123 A1* | 9/2008 | Olliphant | G06Q 40/02 |
| | | | 705/1.1 |
| 2009/0198617 A1* | 8/2009 | Soghoian | G06Q 20/04 |
| | | | 705/65 |
| 2011/0161233 A1* | 6/2011 | Tieken | G06Q 20/40 |
| | | | 705/76 |
| 2013/0297481 A1* | 11/2013 | Assia | G06Q 40/04 |
| | | | 705/37 |
| 2014/0279553 A1* | 9/2014 | Kassemi | G06Q 20/102 |
| | | | 705/66 |
| 2015/0161576 A1* | 6/2015 | Keen | G06Q 20/4016 |
| | | | 705/74 |
| 2015/0254656 A1* | 9/2015 | Bondesen | G06Q 20/36 |
| | | | 705/41 |
| 2015/0269559 A1* | 9/2015 | Inotay | G06Q 20/02 |
| | | | 705/44 |
| 2016/0012465 A1 | 1/2016 | Sharp | |
| 2016/0078568 A1* | 3/2016 | Trivedi | G06Q 50/01 |
| | | | 705/33 |
| 2017/0039608 A1 | 2/2017 | Sandre et al. | |
| 2017/0353436 A1* | 12/2017 | Jurss | H04L 63/1441 |
| 2017/0364936 A1* | 12/2017 | Balfour | G06Q 20/204 |
| 2018/0107992 A1* | 4/2018 | Al-Bedaiwi | G06Q 20/322 |
| 2018/0174137 A1* | 6/2018 | Subbarayan | G06Q 50/01 |
| 2019/0095976 A1* | 3/2019 | Stubbs | G06F 16/335 |

\* cited by examiner

SOCIAL MEDIA ACCOUNT-LINKING CHECKOUT

CROSS REFERENCE TO RELATED APPLICATIONS

This application is a continuation of, and claims priority under 35 U.S.C. § 120 to, U.S. patent application Ser. No. 16/600,920, filed Oct. 14, 2019, the entire contents of which is hereby incorporated by reference as if fully set forth below.

FIELD OF THE DISCLOSURE

Examples of the present disclosure relate generally to systems and methods for providing expedited payments; and more particularly, to systems and methods for linking a social media handle to a financial account for convenient and secure payment within a social media site.

BACKGROUND

Social media platforms are becoming a large source of online commerce. Once limited to connecting friends and family, these sites now provide users a digital platform for receiving news, sharing files, and, more recently, purchasing products. Some of the more dominant social media sites are now providing direct marketplaces for purchasing goods. This can be either directly from the social media company, or from any number of merchants with the social media site acting as a "middle-man" for the transaction. When a user wishes to purchase a product or service on a social media site, however, the current process of completing the transaction relies on the outdated, slow, and cumbersome process of entering credit-card data or account login data in a checkout page.

To purchase goods on these conventional checkout pages, users typically have two options. The first option is to enter their credit card number, expiration date, security code, and name, address, etc. into a form with multiple fields, and then submit the payment. This is not an ideal option as most of social commerce today includes browsing and shopping "on the go," and stopping to enter a significant amount of personal information is cumbersome and poses a security risk. This also poses a significant limitation to the site or merchant wishing to receive the payment. In other words, if a customer has a negative checkout experience, it is more likely that the transaction will be cancelled before the payment is submitted.

The second option is to use an intermediary payment-processor, such as PayPal®, to process the payment. This option requires the user to enter a username and a password, be redirected to another site, perform additional authorizations, and then be directed back to the social media site. Both processes are inefficient and also require more computer processing power, memory, and data transfer. The aforementioned payment form, for example, can include numerous fields that represent a significant amount of sensitive data that must be transferred in a secure manner, further increasing complexity.

Both of these options for checkout pages also provide limitations to computer functionality. Checkout pages ordinarily run slower than other pages on a website because the data on the checkout pages is not cached. This is both for security reasons and because the information stored on a checkout page is dynamic and changes frequently. A checkout page, for example, receives constant changes to the account information, cart totals, items in the cart, and so forth. To that end, the checkout page generally includes only the most recent data when it is loaded. This means that the user device processing the checkout page cannot rely on the faster static RAM (SRAM) but instead must rely on the slower dynamic RAM (DRAM) to populate the page and process the payment. Current systems for checkout pages, therefore, can place a heavy memory burden on user devices with limited DRAM. This can include devices such as, for example, smart watches, which are now used more heavily in this "on the go" state of social commerce.

What is needed, therefore, is a system and method that allows a user to checkout within a social media website flow, without requiring the user to enter credit card, and other personal, information, leave the webpage to access a third-party payment processor, or use excessive memory or processing resources.

BRIEF SUMMARY OF THE INVENTION

Examples of the present disclosure relate generally to expedited payment systems and methods and, more particularly, to systems and methods for linking a social media handle with a financial account for expedient payment within a social media site.

The systems and methods can include linking a social media account to a financial account. The linking of the two accounts can be performed by an account provider system. To link the social media account and the financial account, the account provider system can receive a request to link the accounts and a social media handle from a user device. The account provider system can then generate a payment handle associated with the social media handle. This payment handle can be used by a customer to make purchases within one or more social media systems. The account provider system can, for example, receive a payment request that includes the payment handle from a social media system. The account provider system can also create a layer of security for the payment handles. One way the layer of security can be provided is for the account provider system to determine whether the payment request was received from the social media account linked to the payment handle. If the payment request if received from the linked social media account, the account provider system can approve the payment request and send an approval message to the social media system. If the payment request was not received from the linked social media account, the account provider system can deny the payment request and send a denial message to the social media system.

The payment handles described herein can be used to make a payment within one or more social media sites without the use of a credit card number, a password, or an account number. This can provide benefits to both the user and the user device. By providing a checkout page without the numerous fields associated with traditional checkout pages and payment methods, the user does not need to remember, or enter, a great deal of numbers to make the payment. The user device also benefits from the simplified payment method because the memory and processing power of the device is not consumed by the numerous fields found in traditional checkout pages.

A payment handle can also be customized based on user preference. A payment handle can be active for a limited period of time; for example, the payment handle can be active for a single use, for one day, for one week, etc. The user can also customize the payment handle to work only for qualified purchases. The user can, for example, designate a category of goods and/or a category of merchants for which the payment handle can be used. The user can also create spending limits, and if the purchase price of the good or service exceeds the spending limit, the account provider system can deny the use of the payment handle for that purchase.

An account provider system can also create multiple payment handles for the user. A first payment handle can be generated for a first good, merchant, or spending limit, for example, and a second payment handle can be generated for different goods, merchants, or spending limits. The account provider system can also generate a single payment handle that works across multiple social media accounts. This can enable a user to remember a single payment handle for use in a plurality of linked social media accounts. In other examples, a payment handle may only be approved for a single social media account. A user could, for example, have a designated payment handle for each social media platform in which the user has an account.

Another example of the presently described systems and methods can include a method of expediting a payment. An account provider system can, for example, receive a login request from a user device wishing to access a financial account. The account provider system can generate a graphical user interface (GUI) to display the financial account information and send the GUI to the user device. The account provider system can then receive a request from a user to link a social media account to the financial account. The account provider system can then populate a log in page for the social media account. When a user successfully logs into the account using the login, the account provider system can receive the social media account information from the social media system and generate a payment handle to link to the social media account. This process enables the account provider system to receive the social media account information directly from the social media system without additional user input.

Another example of the presently described systems and methods can include a user device to enable the user to link a social media account to a financial account. The user device can include, for example, a display including a GUI, a transceiver, one or more processors, and a memory that causes the user device to request the account linking and receive the payment handle. The user device can receive a request from the user to log into an account provider system. The user device can then receive a request to link a social media account to a financial account and receive log in credentials for the first social media account. The user device can then receive a payment handle from the account provider system. The payment handle can be linked to both the financial account and a social media handle associated with the social media account. The user device can then display a checkout page that allows the user to input the payment handle. The user device can also receive a request to make a second payment handle to associate with a different social media site.

These and other aspects of the present invention are described in the Detailed Description below and the accompanying figures. Other aspects and features of examples of the present invention will become apparent to those of ordinary skill in the art upon reviewing the following description of specific, exemplary examples of the present invention in concert with the figures. While features of the present invention can be discussed relative to certain examples and figures, all examples of the present invention can include one or more of the features discussed herein. Further, while one or more examples can be discussed as having certain advantageous features, one or more of such features can also be used with the various examples of the invention discussed herein. In similar fashion, while exemplary examples can be discussed below as device, system, or method examples, it is to be understood that such exemplary examples can be implemented in various devices, systems, and methods of the present invention.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner. In the drawings.

DETAILED DESCRIPTION

Figure 1:
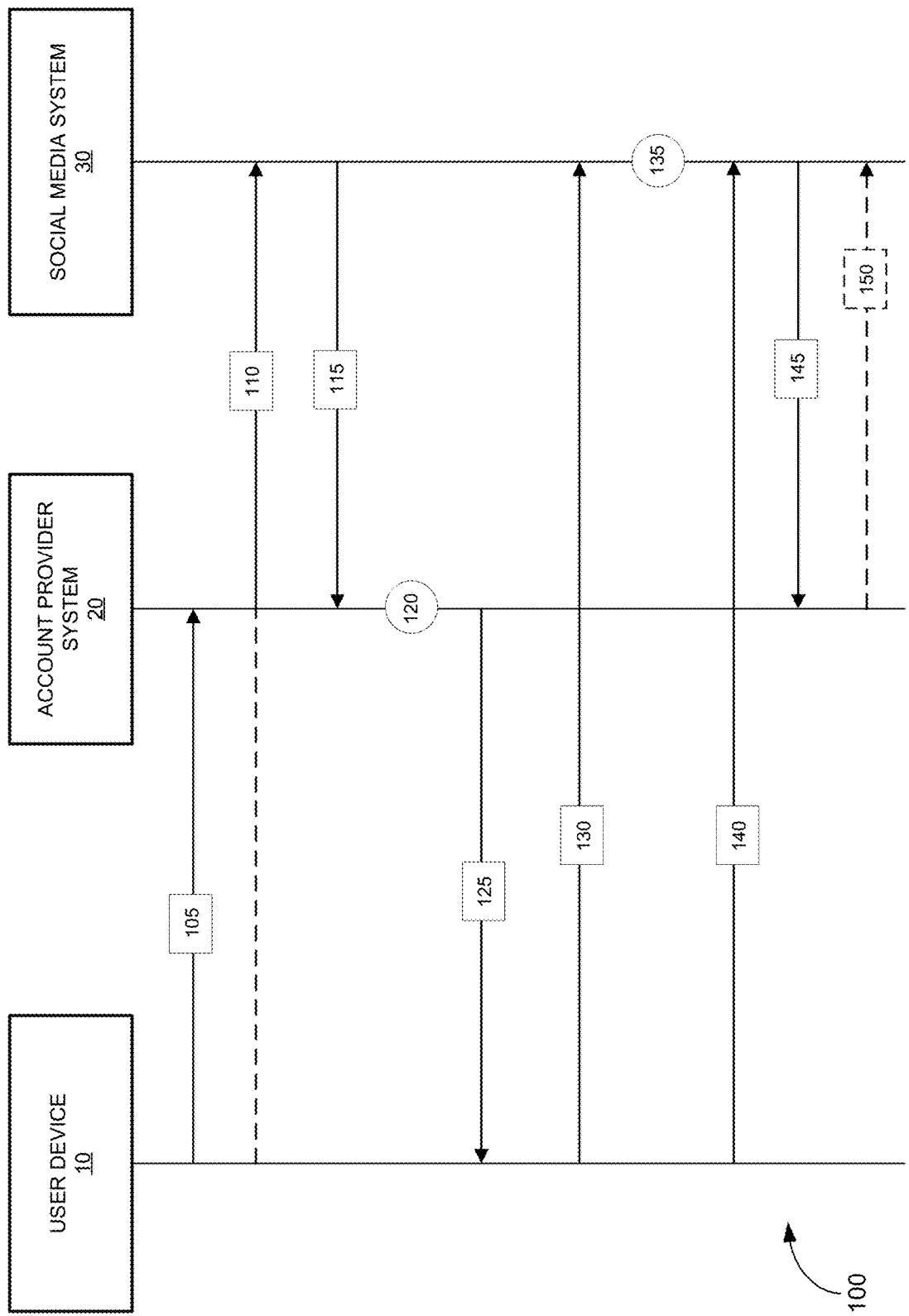
FIG. 1 is a timing diagram depicting linking a social media account with a financial account and making a payment with a payment handle, in accordance with some examples of the present disclosure.

Examples of the present disclosure comprise systems and methods for providing expedited checkout on social media, and other, internet websites. The system can include a user device in communication with one or more account providers, one or more social media sites, and one or more merchants. The system can enable a user to purchase goods and services on social media, and other, internet websites using a convenient, secure payment handle linked to at least one financial account. The system can preclude the need to enter card numbers, addresses, and other private information into webforms, can reduce processing, memory, and network utilization, and can provide more secure payment options for users. As described above, one of the many problems with current checkout methods on social media, and other, sites involves the slow, inefficient process of entering account information into the checkout page. One current method to check out is to select pay by credit card, enter the credit card information (which includes a name, card number, expiration date, security code, etc.), one or more addresses (e.g., shipping and billing addresses), and other information into the fields, and submit payment. In today's dynamic social commerce atmosphere, it is undesirable to require a user to enter this much information both for the speed and convenience issues this represents.

Another method for paying for a product within the social media site is to request a third-party intermediary to process the payment. This includes selecting to pay with the third-party service (e.g., PayPal®), being redirected to the third party's log in page, logging in to the third party's system, and then being redirected to the social media site. This requires not only time but excessive memory, computing power, data, and network resources to complete the transaction. In addition, the third-party site represents yet another connection that is vulnerable to exploitation by hackers, reducing security. Obviously, this method is also not ideal.

What would be useful, therefore, is to provide systems and methods to enable users to securely connect social media sites and/or the shopping platforms associated with the sites to one or more financial account providers. The system should use a convenient, but secure, "handle" that can be used to effect payment. The system could provide different handles for different financial accounts, for example, different social media sites, or different account parameters (e.g., spending limits), among other things. The system would enable users to check out directly on social media, and other, websites simply by typing in a payment handle and pressing "submit." It is to such systems and methods that examples of the present disclosure are directed.

To this end, in some examples, a user can log into an account provider system to associate a social media handle with a financial account. The account provider system can then generate a payment handle for use for payment within the flow of the social media site. This payment handle can be string of characters, for example letters, numbers, and/or special characters, that the user can remember to checkout securely from the social media site. The user can generate multiple payment handles for use with different sites, different accounts (e.g., checking vs. savings), different account providers, or different account parameters—e.g., spending limits, vendors, maximum purchase amount, etc. It is also contemplated that the payment handles described herein can be used in sites other than what might be considered conventional "social media." A payment handle, for example, can be made for online retailers like Amazon® or eBay®, to name a few. Using a payment handle on checkout screens for these retailers can enable the use of familiar "handle" identifiers to purchase goods, while providing the benefits described herein. Accordingly, while discussed below with reference to social media sites for simplicity, it should be understood that other online sites, including online retailers, that enable online purchases are included in the disclosure.

The system can provide payment processing that is not only convenient for the user, but is also significantly more efficient and secure for the user devices, websites, and networks used to make the payment. As described above, checkout pages typically run slower than the other pages on a website. This is because checkout pages do not run on cache data but instead require continuous retrieval and processing of the page. This means that, instead of retrieving the information from the faster static RAM (SRAM), the information is populated by the slower dynamic RAM (DRAM). Placing the burden on the DRAM of a user device can slow other applications running on the device. In addition, a payment form that includes, for example, credit card number, expiration, card verification value (CVV), address fields (e.g., shipping and billing), etc. requires a significant amount of data to be encrypted and securely transmitted over a network and possibly stored on a payment server. Thus, conventional payment methods require an excessive amount of memory, processing power, and network bandwidth for all parties involved.

In contrast, the systems and methods described herein rely on a secure payment handle—a unique identifier that enables a customer to check out with a secure, simple, easy-to-remember code that is securely linked to their financial account. Today's tech savvy customer is already comfortable with the idea of unique "handles" to identify themselves in the social-media, or other online, context. Examples of the present disclosure extend this concept to provide a method of payment.

Consider, for example, a social media site (e.g., Instagram®), where a customer can use a preferred handle, for example @Firstname_Lastname_123, to identify themselves. A similar payment handle can be used for payment requests, and the payment handle can be securely linked to their social media handle. The payment handle can be entered in the checkout page, or alternatively in any in-app screen for purchasing goods or services, and the transaction can be completed. These systems and methods, therefore, can remove the processing, memory, and network requirements from the user device and network and place the heavy lifting on the backend systems of the account provider system and/or the social media system, which are better equipped for such tasks. The systems and methods can also save a considerable amount of time for the user who is making the purchase. The systems and methods can also improve security by reducing the amount of sensitive data being transmitted over possibly vulnerable network connections.

For simplicity and clarity, the systems and methods described herein are described in terms of linking payment handles to financial accounts for use in the social media environment. One of skill on the art will recognize, however, that the system is not so limited. The system could also be used, for example, with other types of websites and mobile applications ("apps"). Indeed, the system could be used to effect many types of electronic transactions on many platforms, including the online retailers described above. In addition, the system is generally described herein with reference to a "user device," such as a smart phone, using an internet connection, but is equally applicable to, and beneficial for, other types of devices (e.g., laptops, tablets, PCs, etc.) and other types of network connections (e.g., cellular, near-field communications (NFC), etc.).

Reference will now be made in detail to exemplary examples of the disclosed technology, examples of which are illustrated in the accompanying drawings and disclosed herein. Wherever convenient, the same references numbers will be used throughout the drawings to refer to the same or like parts.

FIG. 1 is a timing diagram of a method 100 for linking a social media account with a financial account and making a payment with a payment handle (e.g., payment handle 810), according to some examples of the present disclosure. At 105, a user can log into an account provider system 20 using a user device 10. The account provider system 20 can be a system associated with a bank, credit union, credit card company, or other financial provider that maintains payment accounts for making electronic payments. The user device 10 can be a mobile computing device (e.g., a smart phone, tablet computer, smart wearable (e.g., a smart watch), portable laptop computer, voice command device, wearable augmented reality device, or other mobile computing device) or a stationary device (e.g., desktop computer). The log in request at 105 can be performed, for example, by a user opening a website and/or an application associated with the account provider system 20. The account provider system 20 website and/or application can include a method for authenticating the user via, for example, a username and password, personal identification number, etc. Once the user device 10 is logged into the account provider system 20, the account provider system 20 can provide the user device 10 financial account information associated with the user's financial accounts.

At 110, the user can request to log into a social media system 30 and request a social media account be linked to their financial account. The log in request to the social media system 30 can be completed in any number of ways. In some examples, the website and/or application of the account provider system 20 can include fields in a graphical user interface (GUI) to receive log in information for the social media system 30. In this configuration, a user can request to link a social media account to a financial account by entering the account information for the social media account into the fields provided in the account provider system 20 GUI. The account provider system 20 can then act as an intermediary between the user device 10 and the social media system 30 to log into the social media system 30 and retrieve the social media account information without additional input from the user device 10. This process can also act as an authorization to link the social media account to the financial account. This variation is shown by the solid line for 110.

In other examples, a user can request to link a social media account with a financial account within a website and/or application associated with the social media system 30. This variation is shown by the dashed and solid line combination for 110. This variation can include, for example, the social media system 30 providing fields in a GUI associated with the social media system 30 that enable the user to approve the linking of the accounts. The social media system 30 can receive the approval and transmit a notification to the account provider system 20 indicating the user wishes to link accounts. When the account provider system 20 receives the notification from the social media system 30, the account provider system 20 can provide fields in the account provider system 20 GUI that enables the user to proceed with linking the accounts.

At 115, the account provider system 20 can receive a social media handle associated with the user's account with the social media system 30. The social media handle is a unique identifier that is associated with the user in the social media system 30. In some social media systems 30, the social media handle can be as simple as user's name, for example in Facebook® a social media handle can be John Smith; this is also true for many online retailers. In other social media systems 30, the social media handle can be a unique identifier that is either chosen by the user or the system. On Instagram®, for example, the user above can have a handle similar to @FirstnameLastname12 or any other number of handles like @Nickname4. In some examples, such as when the account provider system 20 acts as an intermediary (as described above) the social media handle can be received at the account provider system 20 directly from the social media system 30. In other examples, the account provider system 20 can receive the social media handle from the user device 10 (or rather, the user), for example, in a field within the account provider system 20 website and/or application. In some examples, the account provider system 20 can receive more than one social media handle at step 115, which can all be linked to the financial account. Linking multiple social media handles to a single financial account and a single payment handle can enable payments across multiple channels, while the user only has to remember one payment handle. A single payment handle, for example, can be used across multiple channels, as will be described in greater detail below.

At 120, the account provider system 20 can generate a payment handle to associate with the social media handle(s) received at 115. In some examples, the payment handle can be a string of characters that can resemble a social media handle. Social media users are familiar with character strings such as, for example, @FirstnameLastname12. As a result, the payment handle can be in a similar, familiar format for convenience. In some examples, the payment handle can begin with a prefix symbol such as the "@" or "#" symbols, which are familiar methods of identifying a handle in the social media landscape; however, it is also contemplated that the payment handle does not include a prefix symbol. In other examples, the payment handle can be a different format chosen by the user, for example, or the account provider system 20.

The length of the payment handle can be customized based on a user's security preferences, the number of customers that the account provider has, or based on similar handle formats as those used by social media or other outlets. A short payment handle, for example, can be easy to remember, but a long payment handle will generally be more secure—i.e., it is more difficult for a potential identity thief to learn or remember.

In some examples, to be similar to website passwords and other handles, the payment handle can be from between 6 to 20 characters. Of course, the payment handle can be shorter or longer depending on security requirements, number of users, user preferences, etc. A small credit union, for example, can be able to use shorter payment handles because they have fewer members, for example; while a large credit card provider can use longer payment handles simply because they have millions of customers. In some examples, the payment handle can be generated to exclude easily identifiable information such as the user's name, spouse's name, birthday, etc.

In some examples, the payment handle can be generated to correspond to the financial account provider associated with the handle. If the account provider system 20 generating the payment handle is Capital One Bank®, for example, the payment handle can include an identifier for the provider. This can include adding, for example, C1, CO, COF, etc. at the end of the handle, e.g., @Nickname_C1. This example can also allow the user to choose from which account they wish to make a payment, when the user has payment handles associated with more than one account, bank, or financial institution.

In some examples, the social media handle and the payment handle can have some portions in common for convenience. If the social media handle is @Nickname_14, for example, the payment handle could be @Nickname_C1_14, @Nickname_14_C1, or some other variation that provides some randomness, yet is easier to remember. In other examples, the social media handle and the payment handle can be partially, or completely, different to add a layer of security. If a fraudster accesses a user's social media account, the fraudster cannot simply retype the user's social media handle, for example, or provide some known, or trivial, addition to the social media handle to make a purchase.

Figure 6:
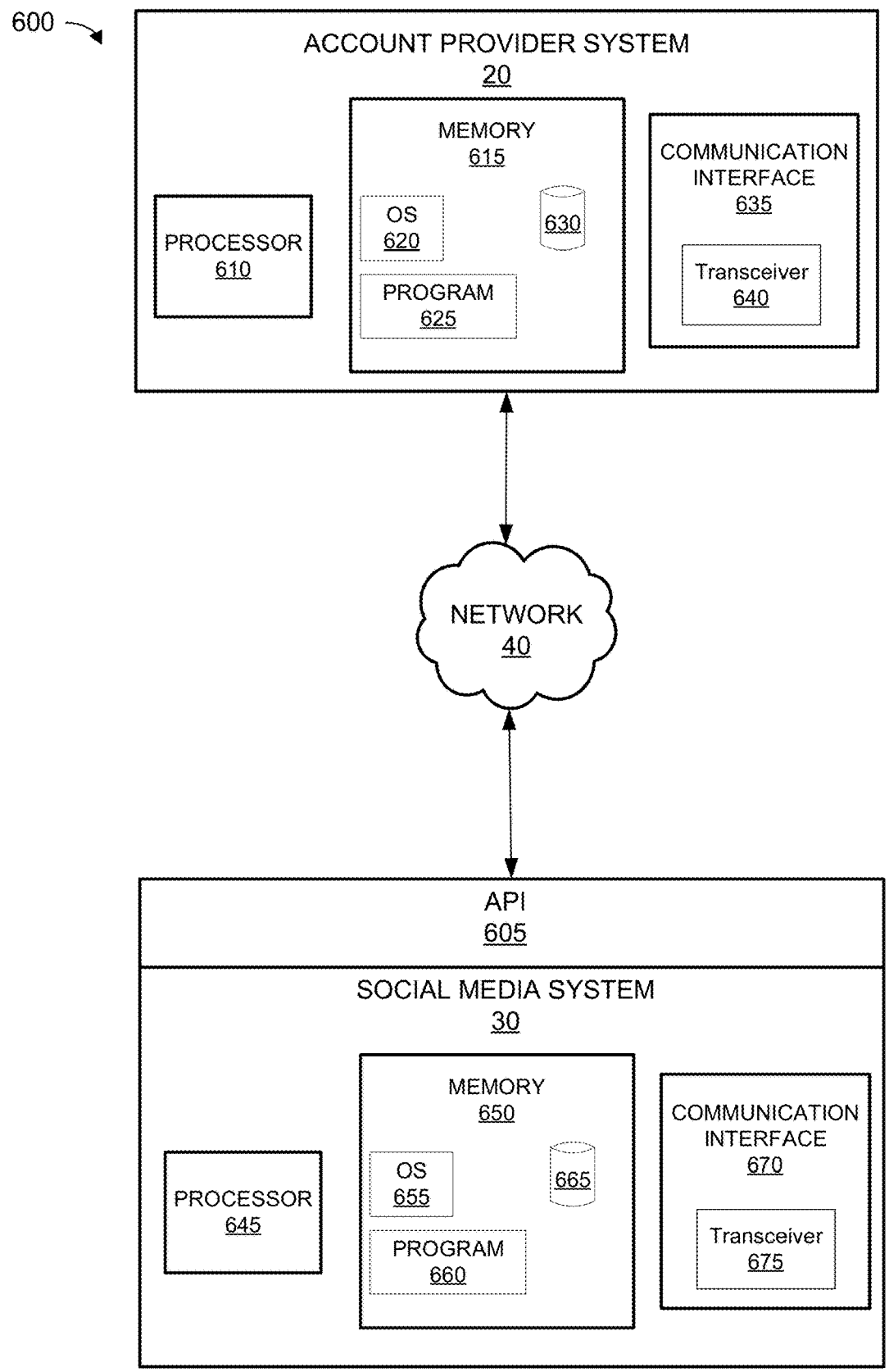
FIG. 6 is a diagram of an example system that can be used to link a social media account to a financial account, in accordance with some examples of the present disclosure.

In other examples, the account provider system 20 can also store the social media handle-payment handle pairs within data storage (e.g., database 630, shown in FIG. 6). The user can also have multiple payment handles with various user preferences. The multiple payment handles can be authorized for use in particular categories of payments, with particular merchants, with various spending limits, etc. The user preferences can also include a list of approved goods for which the payment handle can be used. A user can identify a first payment handle, e.g., @Name_C1_F, that is to be used only for the purchase of furniture on the social media system 30. The user can identify a second payment handle, e.g., @Name_C1_C, that is to be used only for the purchase of clothes on the social media system 30. This provides a user not only a greater degree of security for the payment handles, but can also enable the user to track their monthly spending for particular goods. In addition, this provides an additional layer of security because a fraudster may know only one, or a few, of the payment handles and may not know the user restrictions for any of the payment handles. If a fraudster were to attempt to buy clothing with the furniture payment handle (@Name_C1_F), for example, the payment would be declined by the account provider system 20.

The user can also provide a list of approved merchants with whom a payment handle can be used. A customer, for example, can identify a first payment handle, e.g., @Name_C1_Nike, to be used only to purchase goods from Nike®, and the user can identify a second payment handle, e.g., @Name_C1_Oakley, to be used only to purchase goods from Oakley®. The user can also set a maximum transaction amount or a spending limit (e.g., $400/mo.) for a particular handle. This can also provide an extra layer of security for the social media handle—payment handle pair. The account provider system 20 can receive a maximum transaction amount from the customer, e.g., $100, and the account provider system 20 can generate a payment handle for that amount, e.g., @Name_C1_100. This obviously limits purchases to that amount for that handle. The user could also create other payment handles with higher or lower maximum transaction amounts. Similarly, the user can generate different payment handles with different daily, monthly, or yearly spending limits. The user can create a payment handle for entertainment, for example, that is limited to $600/mo. to better monitor spending.

In some examples, the payment handle generated by the account provider system 20 can be active for a limited period of time or for a limited number of uses. This limited period of use can be set, for example, for a single use, a single day, a single week, etc. In the furniture example described above, a user may not generally be interested in purchasing furniture. But, the user may be in the process of moving into a new home and may wish to have a payment handle generated to purchase furniture during the moving process. A limited, one-month payment handle, for example, can be generated so that the user can keep track of furniture expenses over the course of the month. When the limited payment handle expires, the payment handle can be rendered inoperable, preventing accidental or fraudulent use of the limited payment handle.

Another example of limited-use handles can include single-use payment handles. One potential use of a single-use payment handle can be, for example, to provide a payment handle to another person to use for a gift. Consider for example a parent that wishes to give their child a payment handle so the child can purchase a birthday gift for him/herself. The parent can provide the account provider system 20 a social media handle associated with the child's social media account. The parent can then request the account provider system 20 to create the single-use payment handle to associate with the child's social media account, but linked to the parent's financial account. The parent can then send the single-use payment handle to the child to make a one-time purchase. The parent may also set a spending limit (e.g., $100). Once the single-use payment handle is used for a payment, the account provider system 20 can deactivate the payment handle.

A user can also create a payment handle that is used only for a single login session within the social media system 30. As in the example described above for step 110, a user is able to enter account information for the social media account into fields provided in the account provider system 20 GUI. The account provider system 20 can then act as an intermediary between the user device 10 and the social media system 30, allowing the user to input social media login information directly into the account provider system 20 GUI. A similar example can enable a user to request a single-login payment handle and be directed to a social media system 30 directly from the account provider system 20. The single-login payment handle can then be active only while the user is logged into the social media account, i.e., it expires as soon as the user signs out of the account.

In some examples, the payment handle generated by the account provider system 20 can be associated with a single social media system 30. In other examples, the payment handle can be associated with more than one social media system 30. Both of these examples provide benefits to the user. If a single payment handle is associated with only one social media system 30, for example, the user has the option to create an additional level of security for the payment handle. A user can create a first payment handle to associate only with a first social media system 30 (e.g., Facebook®), and this payment handle can be inoperable if used in a purchase request in a second social media system 30 (e.g., Instagram®). On the other hand, a user can create a first payment handle to associate with a plurality of social media systems 30, so that the user does not need to remember a separate payment handle for each social media system 30. This can enable the user to use (and remember) a single payment handle when shopping across all social media accounts.

At 125, the account provider system 20 can send the generated payment handle to the user device 10. The payment handle can be sent to the user device 10 by displaying the payment handle within the website and/or the application associated with the account provider system 20. The payment handle can also be sent to the user device 10 via wireless communications, such as short message service, e-mail, or the like. A user can enroll in push notification services with the account provider system 20, for example, to receive payment handle notifications on the user device 10.

At 130, the user can make a selection on the user device 10 to purchase a product or service in a social media website and/or application associated with the social media system 30. This step can be similar to customary purchasing systems where a user can select a product or service and then be directed from the browsing section of the website or application to the appropriate screen, or checkout page, to complete the purchase.

At 135, the social media system 30 can populate a checkout page (e.g., checkout page 820, shown in FIGS. 8A and 8B) to purchase the goods or services. The checkout page can be displayed in a GUI associated with the social media system 30 website and/or application, which can include a field to accept the payment handle. In some examples, the GUI can also include an option to use a legacy checkout page. Notably, only when the legacy checkout page option is selected, however, is the social media system 30 burdened with displaying the legacy checkout page and associated fields.

As described above, the simple field in the checkout page to accept a payment handle provides an improvement over legacy checkout pages. In systems of the prior art, a checkout page would provide only two options: an option to enter the account information found on a transaction card, or an option to use a third-party service to process the payment. Neither of these two options are ideal for the user device 10. Oftentimes, user devices 10 that complete purchases on a website or application have limited memory and processing capabilities.

Consider aging mobile phones, for example, or smart wearable devices. Because checkout pages require the use of the slower dynamic RAM (DRAM) to populate the page and process the payment, legacy checkout pages can drain resources from other applications on the user device 10. For a user device 10 to load a checkout page requesting a card number, expiration date, security number, address(es), and user name, the user device 10 must populate each of these fields, and then the user must enter each of those characters into the fields. This is a slow process for both the user device 10 and the user.

Consider also systems that require the user to sign into a third-party platform such as, for example, PayPal®. This method not only requires the checkout page to include fields for the username and password for the third-party system but also requires the user device 10 to leave the social media website or application and enter a third-party website or application—often leaving both applications or websites open at the same time. This is also a resource drain for user devices 10 and a hassle for the user. When the social media system 30 provides a simplified checkout page with a single field for the payment handle, the user device 10 is able to make the payment request with only a few characters entered into a single field.

At 140, the user can enter the payment handle into the field 830 to complete the payment request with the social media system 30. In some examples, this step can include the user device 10 sending the payment handle to the social media system 30. In other words, in response to an input from the user, the user device 10 can send the payment handle, an encrypted version thereof, a token, etc. directly to the social media system 30 to effect payment. The completion of the payment request can be made, for example, by selecting a "submit" or "pay" radio button (or the like) within the checkout page. In some examples, the payment request can be made solely by entering the payment handle. Accordingly, the payment request does not require a credit card number, a password, or an account number associated with the financial account. This can enable the payment request to be made with minimal use of the memory and processing resources for the user device 10 and social media system 30. In some examples, for added security, the checkout page can also require a password including, but not limited to, the user's password for the social media site.

At 145, the social media system 30 can send a request to the account provider system 20 requesting funds to pay for the checkout total in the checkout page. The funds can be requested from an account associated with the user of the user device 10.

At 150, the account provider system 20 can transmit the funds from the financial account associated with the payment handle (and the user) to a financial account associated with the social media system 30 or an associated merchant (i.e., when the social media system 30 is acting as an intermediary, for example). In other words, the social media system 30 can act as a direct merchant or can act as an intermediary between the account provider system 20 and the merchant system (e.g., merchant system 50, shown in FIG. 5). In other examples, based on information provided in the payment request, the account provider system 20 can transmit the funds directly to the merchant system.

Figure 2:
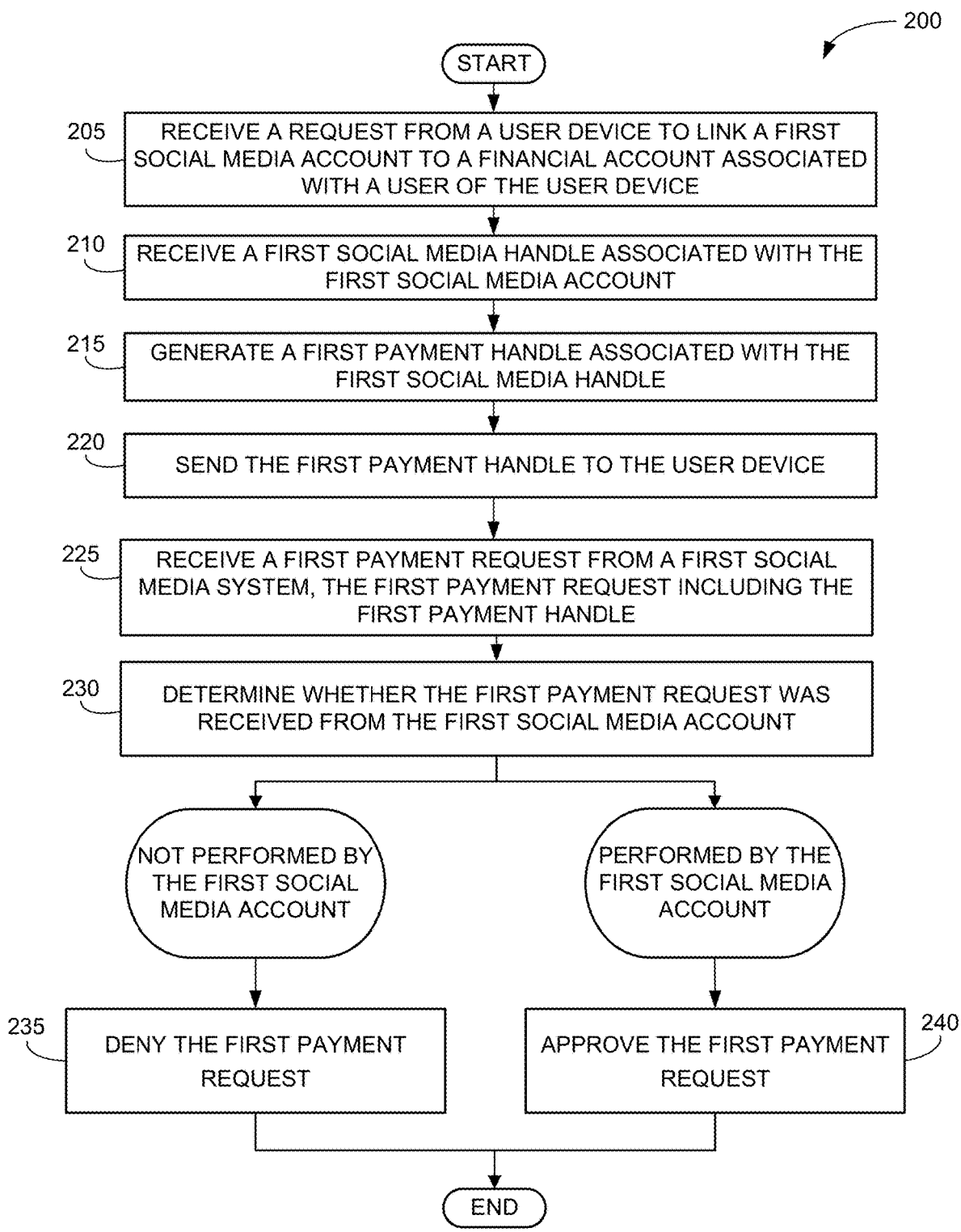
FIG. 2 is a flowchart of an example of a method for linking a social media account with a financial account and approving or denying a payment request, in accordance with some examples of the present disclosure.

FIG. 2 is a flowchart of an exemplary method 200 of linking a social media account with a financial account and approving or denying a payment request, according to some examples of the present disclosure. In block 205, the method 200 includes receiving a request from a user device 10 to link a first social media account to a financial account associated with a user of the user device 10. The request can be received at a transceiver (e.g., transceiver 640, shown in FIG. 6) of the account provider system 20. The first social media account can be associated with the social media system 30 and the financial account can be associated with the account provider system 20.

In block 210, the method 200 includes receiving, a first social media handle associated with the first social media account. As described above, the social media handle can be received either from the social media system 30 or from the user device 10. In some examples, the account provider system 20 can transmit, with the transceiver, a consent notification to the user device 10 requesting approval to link the payment handle 810 with the social media handle. The consent notification can be sent via short message service, e-mail, push notification, and/or the like. The consent notification can add an additional level of security to the system to ensure the user wishes to link the accounts.

In block 215, the method 200 includes generating a first payment handle (e.g., payment handle 810, shown in FIG. 8B) associated with the first social media handle. The first payment handle can be generated by a processor of the account provider system 20 (e.g., processor 610, shown in FIG. 6).

In block 220, the method 200 includes sending, with the transceiver, the first payment handle to the user device 10. As described above, the first payment handle can be sent to the user device 10 by displaying the first payment handle on a GUI associated with the account provider system 20. Alternatively, the first payment handle can be sent to the user device 10 by short message service (SMS), e-mail, a push notification service, or the like. In some systems, and as described above, the account provider system 20 can have a backend system that can include hardware and/or software that enables the backend services of the account provider system 20. These services can include storing information about customers who wish to enroll in push notifications. These push notifications can include, but are not limited to, notifications of an attempt to link a financial account to a social media account, notifications of a new payment handle associated with a payment account, and/or notifications that the payment handle has been used in a payment request.

In block 225, the method 200 includes receiving, at the transceiver, a first payment request from a first social media system 30, the first payment request including the first payment handle. This first payment request can be a request for funds to cover the cost of goods or services in the checkout page of the social media site.

In block 230, the method 200 includes determining, with the processor, whether the first payment request was received from the first social media account. This step can be an authorization step for the systems and methods described herein. The payment handle can include a string of characters that enables a user to purchase goods while the user is within the flow of the social media website or application. And as described above, the payment handle does not require a credit card number, a password, or an account number associated with the financial account.

Identity theft of account information is a major concern in today's social economic commerce. To this end, one method to ensure the payment handle is only used by an authorized user is to access whether the payment request using the payment handle was performed by the social media account and within the social media site, or rather by a person using the social media handle associated with the account. By requiring the payment handle to be used by a particular social media account, an identity thief wishing to make an unapproved payment would need to access both the social media account and the user's unique payment handle to effect the payment.

In block 235, the method 200 includes denying, by the account provider system 20, the first payment request when the first payment request was not received from the first social media account. As described above, this step shows the ability of the system to identify if someone is either fraudulently or inadvertently trying to purchase a good or service with a payment handle that is not associated with the social media handle. The step can include sending, with the transceiver, a denial message to the first social media system 30 to alert the social media system 30 that the payment cannot be processed. The step can include sending a notification, through SMS, e-mail, or push notification as described above, to the user device 10 describing the failed payment request. In some examples, the account provider system 20 can identify and tag the payment request being made from a non-linked social media account as potential fraud. The account provider system 20 can send a warning message to the user device 10 notifying the user of the potential fraud, for example through SMS, e-mail, push notification, or similar notification. The account provider system 20 can then generate, for example with the processor, a new payment handle to associate with the first social media account, deactivate the first payment handle, and transmit the new payment handle to the user device, for example through the notification methods described herein.

In block 240, the method 200 includes approving the first payment request when the first payment request was received from the first social media account. This step shows a successful purchase of the goods or services. The step could also include sending, with the transceiver, an approval message to the first social media system 30 and/or the user device 10.

As described above, once a payment request has been fully processed, the account provider system 20 can transmit funds to cover the first payment request from the financial account associated with the user to a financial account associated with the first social media account. In this example, the social media system 30 can act as a payment intermediary for a merchant system (e.g., merchant system 50, shown in FIG. 5). In other examples, the account provider system 20 can transmit the funds directly to a financial account associated with a merchant, or for example to the merchant system without the social media system 30 acting as an intermediary.

As discussed above, the payment handle can be associated with a single financial account and a single social media handle or a plurality of social media handles. In other words, in some examples, the steps described above for blocks 205-240 can be repeated for a second social media account associated with a second social media system 30. The account provider system 20, for example, can receive a request from the user device 10 to link a second social media account to the same financial account. This can be completed by linking, by the account provider system, a second social media account to the first payment handle. The account provider system 20 can then receive a second payment request from a second social media system 30 using the first, previously-generated payment handle. The account provider system 20 can then authenticate the second payment request as outlined above in steps 230-240. This example enables a user to have a single payment handle to use in a plurality social media accounts (i.e., though two social media accounts are used in this example, the system is not limited to two).

In other examples, the account provider system 20 can create a different payment handle for each social media account. In this configuration, the steps described above for blocks 205-240 can be repeated to create a second payment handle to associate with a second social media system 30. The account provider system 20, for example, can receive a request from the user device 10 to link a second social media account to the financial account. The account provider system 20 can then generate a second payment handle to associate with the second social media handle, and a second payment request can be made in a second social media account with the second payment handle. The account provider system 20 can then authenticate the second payment request as outlined above in steps 230-240 to determine whether the second payment request was received from the second social media account. This example enables a user to have a different payment handle for each social media account.

Figure 3:
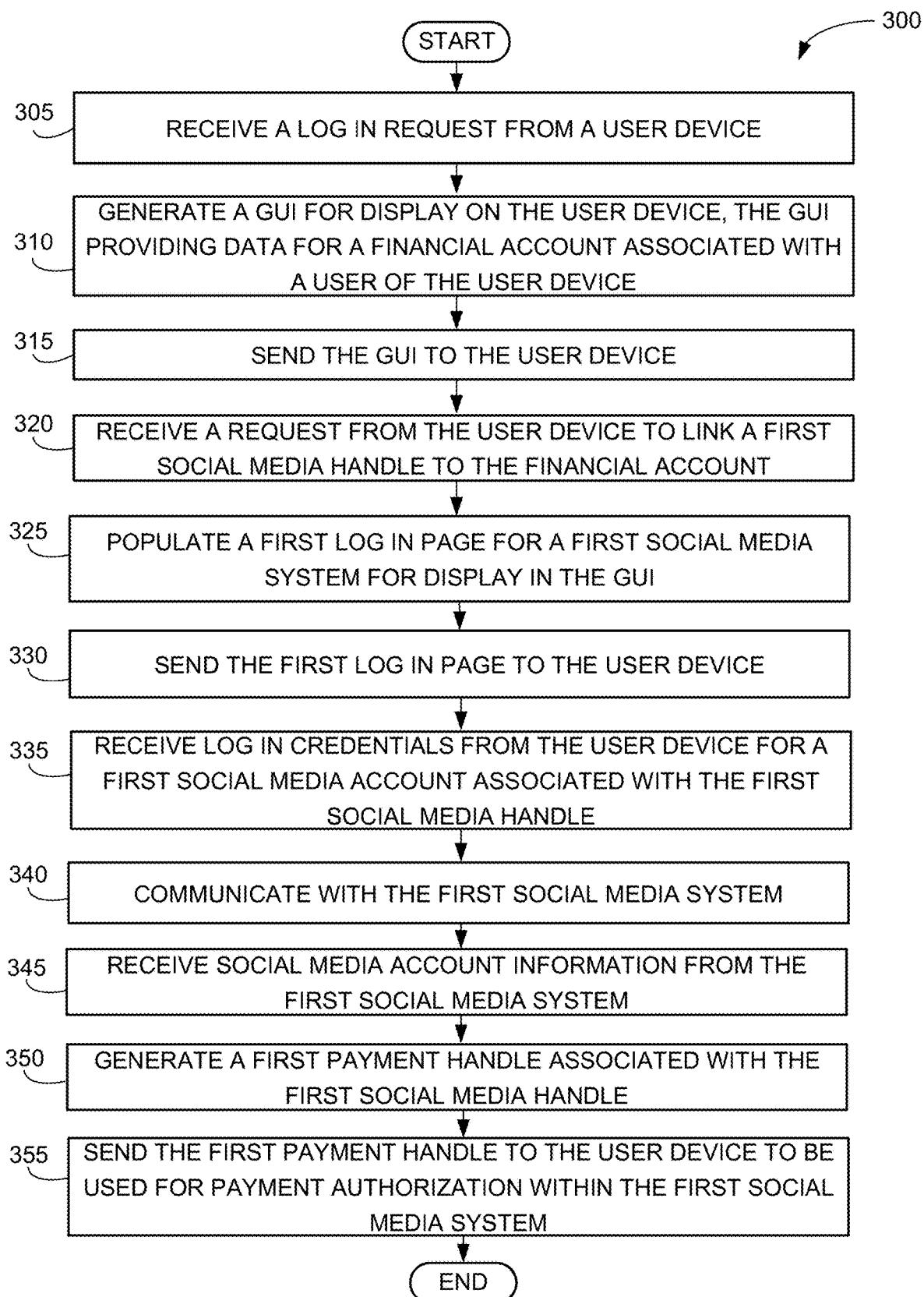
FIG. 3 is a flowchart of an example of a method for linking a social media account with a financial account and generating a payment handle for payment authorization, in accordance with some examples of the present disclosure.

FIG. 3 is a flowchart of an exemplary method 300 of linking a social media account with a financial account and generating a payment handle for payment authorization, according to some examples of the present disclosure. In block 305, the method 300 includes receiving, at the account provider system 20, a log in request from a user device 10. The log in request can be received by a transceiver associated with the account provider system 20 (e.g., transceiver 640, shown in FIG. 6). A user can log into an account associated with the account provider system 20, for example, within a website and/or application associated with the account provider system 20. In block 310, the method 300 includes generating, with a processor (e.g., processor 610, shown in FIG. 6) of the account provider system 20, a graphical user interface (GUI) for display on the user device 10. The GUI can provide data for a financial account associated with a user of the user device 10. The GUI can display the data associated with the financial account, can provide a platform to navigate to a page associated with linking social media handles to financial accounts, etc. In block 315, the method 300 includes sending, with the transceiver, the GUI to the user device 10. In block 320, the method 300 includes receiving, at the transceiver, a request from the user device 10 to link a first social media handle to the financial account. In block 325, the method 300 includes populating, with the processor, a first log in page for a first social media system for display in the GUI. In block 330, the method 300 includes sending, with the transceiver, the first log in page to the user device 10. In block 335, the method 300 includes receiving, at the transceiver, log in credentials from the user device 10 for a first social media account associated with the first social media handle. The social media account can be associated with the social media system 30. In block 340, the method 300 includes communicating, by the transceiver, with the first social media system 30. In block 345, the method 300 includes receiving, at the transceiver, social media account information from the first social media system 30. In block 350, the method 300 includes generating, with the processor, a first payment handle associated with the first social media handle. In block 355, the method 300 includes sending, with the transceiver, the first payment handle to the user device to be used for payment authorization within the first social media system. After the step shown in block 355, the process for making a payment can proceed as described above for blocks 225-240 in FIG. 2. Steps 305-355 can also be repeated for a second social media account associated with a second social media system 30, as described above for FIG. 2. The system, for example, can generate a single payment handle to work across multiple social media account, or the system can create multiple payment handles, where each payment handle is associated with a single social media account.

Figure 4:
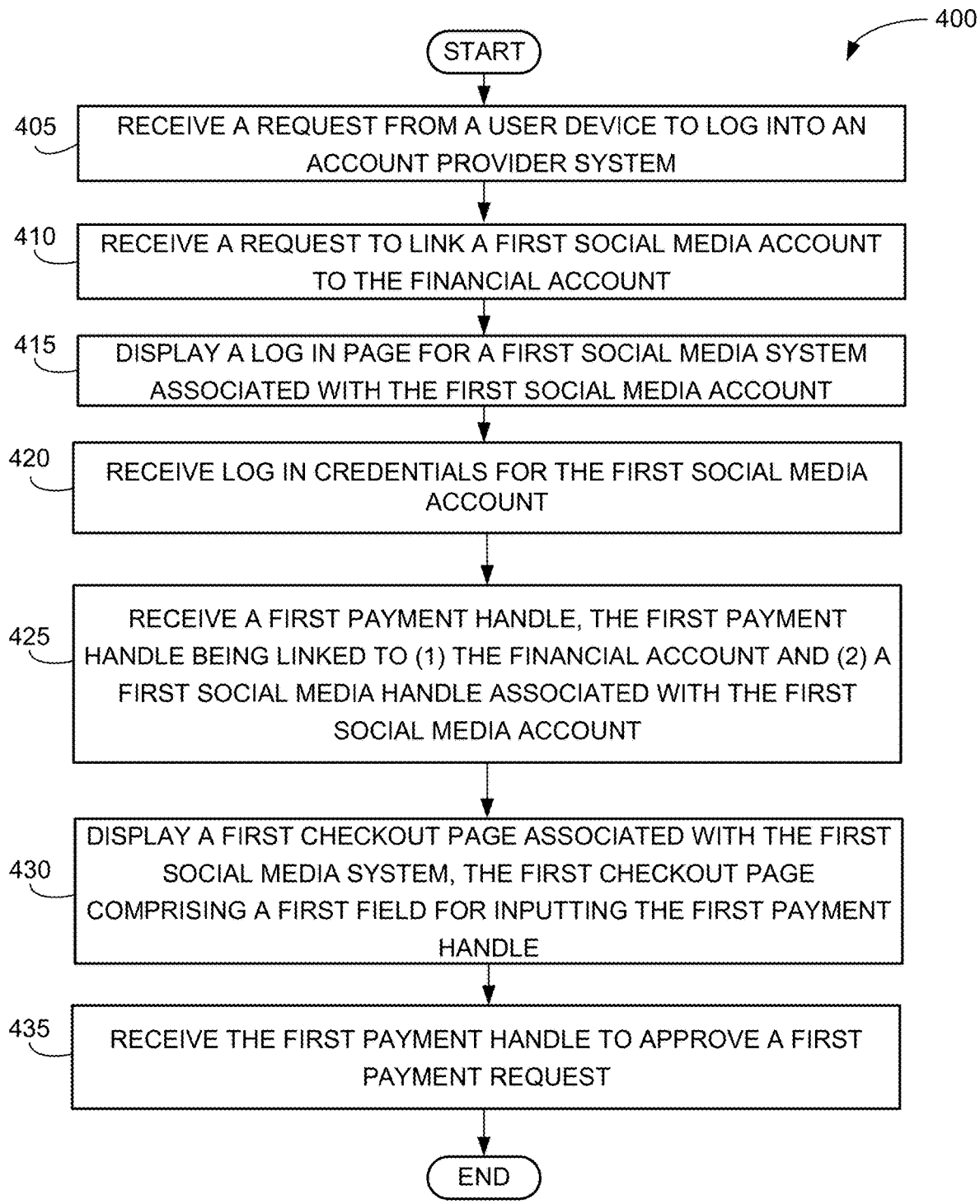
FIG. 4 is a flowchart of an example of a method for making a payment with a payment handle, in accordance with some examples of the present disclosure.

FIG. 4 is a flowchart of an example method 400 of making a payment with a payment handle, according to some examples of the present disclosure. The steps performed in FIG. 4 can be performed by using the exemplary components of a user device 10 shown in FIG. 7, including but not limited to a processor 705, a display 755, a transceiver 750, a memory 710, and a user interface ("U/I") device 735 for receiving user input.

In block 405, the method 400 includes receiving, at an input of the user device 10, a request from a user to log into the account provider system 20. In block 410, the method 400 includes receiving, at the input, a request to link a first social media account to a financial account. In block 415, the method 400 includes displaying, on the GUI, a log in page for a first social media system 30 associated with the first social media account. In block 420, the method 400 includes receiving, at the input, log in credentials for the first social media account. In block 425, the method 400 includes receiving, at the transceiver, a first payment handle from the account provider system 20. The first payment handle can be linked to (1) the financial account and (2) a first social media handle associated with the first social media account. In block 430, the method 400 includes displaying, on the GUI, a first checkout page (e.g., checkout page 820, shown in FIG. 8B) associated with the first social media system 30. The first checkout page can include a first field for inputting the first payment handle. In block 435, the method 400 includes receiving, at the input, the first payment handle to approve a first payment request.

In some examples, the steps described above for blocks 410-435 can be repeated for a second social media account associated with a second social media system 30, as described above for FIGS. 2 and 3. A user device 10 can, for example, request to link a second social media account to a financial account. The user device 10 can receive a second payment handle that is liked to (1) the financial account and (2) a second social media handle associated with the second social media account. A second payment request can be made using the second payment handle. Alternatively, the user device 10 can receive a request from the user to link a second social media account to the first payment handle. The user can then use the single payment handle in both the first and second social media accounts.

Figure 5:
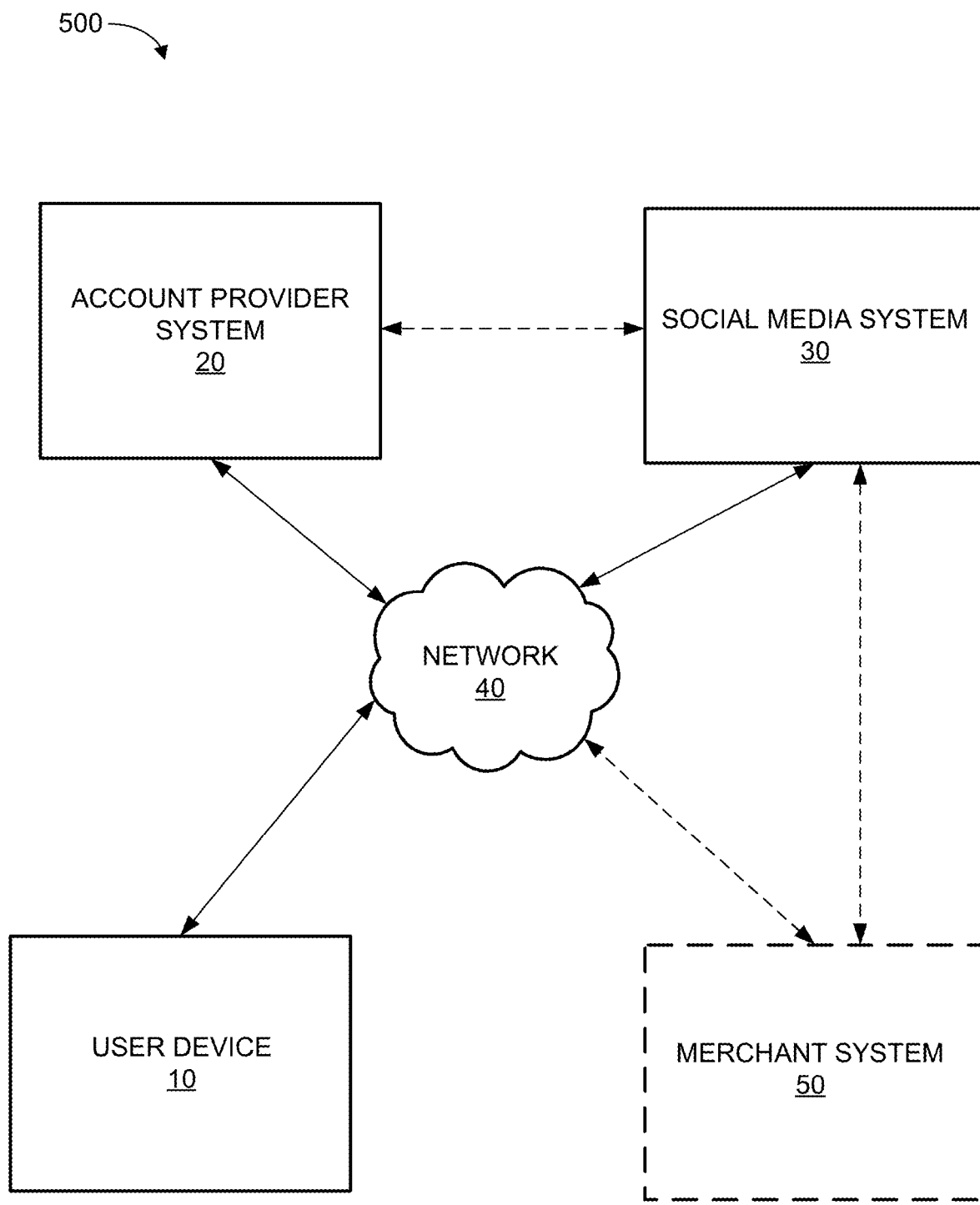
FIG. 5 is a diagram of an example system that can be used to provide expedited payments, in accordance with some examples of the present disclosure.

FIG. 5 is a diagram of an example system 500 that can be used to implement one or more examples of the present disclosure. According to some examples, the system 500 can include the user device 10 in communication with the account provider system 20 and the social media system 30 via a network 40. The user device 10 can be a mobile computing device (e.g., a smart phone, tablet computer, smart wearable (e.g., a smart watch), portable laptop computer, voice command device, wearable augmented reality device, or other mobile computing device) or a stationary device (e.g., desktop computer). An example of the user device 10 is described more fully below with reference to FIG. 7.

The account provider system 20 can be associated with a bank, credit union, credit card company, or other financial provider that maintains payment accounts for making electronic payments. The account provider system 20 can store banking account information for users, including for example checking accounts, savings account, credit card accounts, gift card balances, and the like. An example of the account provider system 20 is described more fully below with reference to FIG. 6. The account provider system 20 can include a backend system that can include hardware and/or software that provides the backend services of the account provider system 20 such as, for example, banking applications, payment platforms, reward enrollment platforms, push notification enrollment platforms, lending platforms, and the like.

The social media system 30 can be associated with a social media service or website such as, for example, Facebook®, Instagram®, Pinterest®, Twitter®, YouTube®, and the like. As described above, however, the social media system 30 could also include online retailers that also provide checkout screens. An example of the social media system 30, described in more detail, is included below with reference to FIG. 6. The social media system 30 can display a checkout page on the user device 10, receive a payment handle (e.g., payment handle 810 in FIG. 8B) from the user device 10, and submit a request for payment to the account provider system 20.

The network 40 can be of any suitable type, including individual connections via the internet such as wired or wireless networks. The wired networks can be an Ethernet network and the wireless networks can be cellular or WiFi™ networks, for example. In some examples, network 40 can connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted can be personal or confidential, the connections can also be encrypted or otherwise secured. In certain examples, however, the information being transmitted can be less personal, and therefore the network connections can be selected for convenience or speed over security, as applicable.

The system 500 can also include a merchant system 50. The merchant system 50 can be in communication with the user device 10, the account provider system 20, and/or the social media system 30 via the network 40. The merchant system 50 can be associated with the goods or services being purchased on, or facilitated by, the social media system 30. When a user of a user device 10 makes a purchase on a social media site, for example, the user device 10 can communicate directly with the merchant system 50 to complete the transaction. In other examples, the user device 10 does not communicate directly with the merchant system 50. In these examples, the account provider system 20, merchant system 50, and social media system 30 can finalize the transaction via a network that does not communicate with the user device 10. In some examples, the account provider system 20 can receive a payment request from the social media system 30, and the account provider system 20 can transfer funds to an account associated with the social media system 30. The social media system 30 can then transfer appropriate funds to the merchant associated with the merchant system 50. In this manner, the social media system 30 can act as an intermediary for the payment request.

FIG. 6 is a diagram of an example system 600 that can be used to link a social media account to a financial account, according to some examples of the present disclosure. The system 600 in FIG. 6 shows the components that can be associated with the account provider system 20 and the social media system 30.

The account provider system 20 can include a processor 610. The processor 610 can include one or more of a microprocessor, microcontroller, digital signal processor, co-processor or the like or combinations thereof capable of executing stored instructions and operating upon stored data. In some examples, the processor 610 can generate the payment handles described herein. The processor 610 can also authenticate the payment requests, for example by determining whether the payment request was received from the appropriate social media account.

The account provider system 20 can include a memory 615. The memory 615 can include, in some implementations, one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data.

The memory 615 of the account provider system 20 can contain an operating system ("OS") 620 that can run one or more programs 625. The one or more programs 625 can perform one or more functions of the disclosed examples. The one or more programs 625 can include, for example, a linking application that facilitates the linking of a social media account with a financial account. The linking application can also be provided within the GUI associated with the account provider system 20 so that the user device 10 can communicate with the account provider system 20 via the linking application. The one or more programs 625 can also include an approval application that operates to approve a payment request. The approval application can, for example, store rules that enable the processor 610 to determine whether the payment request was received from the appropriate social media account.

The memory 615 can also include any combination of one or more databases 630 controlled by memory controller devices (e.g., server(s), etc.) or software, such as document management systems, Microsoft® SQL databases, SharePoint® databases, Oracle® databases, Sybase® databases, or other relational databases.

The account provider system 20 can include a communication interface 635 for communicating with external systems. The communication interface 635 can include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof. The communication interface 635 can include a transceiver 640 to communication with compatible device. A transceiver 640 can be compatible with one or more of: radio-frequency identification (RFID), near-field communication (NFC), Bluetooth™, low-energy Bluetooth™ (BLE), WiFi™, ZigBee™, ambient backscatter communications (ABC) protocols, or similar technologies that enables the account provider system 20 to communication via the network 40, as described herein.

The social media system 30 can include components similar to those found in the account provider system. For example, the social media system 30 can include a processor 645 similar to the processor 610 for the account provider system 20. The social media system 30 can include a memory 650 similar to the memory 615 for the account provider system 20. The memory 650 can include an operating system ("OS") 655 that can run one or more programs 660 (similar to OS 620 and programs 625 above). The memory 650 can include one or more databases 665, similar to databases 630 for the account provider system 20. The social media system 30 can also include a communication interface 670 that is similar to the communication interface 635 described above. The communication interface 670 can also include a transceiver 675 similar to the transceiver 640 described above.

The system 600 can also include a linking application programming interface (API) 605 that is either associated with the social media system 30, as shown, or the account provider system 20. The linking API 605 can enable certain data to be transferred between the social media system 30 and the account provider system 20 while preventing other data from transferring between systems. One example system described herein includes a GUI of the account provider system 20 receiving the login credentials for the social media site. A field, for example, can be provided in the account provider system's 20 GUI to allow the user to link the social media account without leaving the account provider system 20 website or application. A linking API 605 associated with the social media system 30 can, for example, prevent personal information that is not needed to link the handles from passing to the account provider system 20. The data that can be prevented from passing can include, but is not limited to, photographic data, likes and/or interests for the user, friend and family status, and the like. The linking API 605 can, therefore, act to protect a user from sending information to the account provider system 20 that the user intends to keep from their bank or financial provider. The linking API 605 can also provide encryption and filtering functionality to prevent, for example, identity theft and fraudulent transactions that can arise from linking the social media accounts to the financial accounts. In some examples, the linking API 605 can send data that is limited to social media handle, user identification information such as full names or nicknames, or user location information. User location information can be used by the account provider system 20, for example, to determine if the customer associated with the financial account lives in the same city or state as the person that operates the social media account. If the state and/or city of the customers does not match, the account provider system 20 can send a warning message as described herein and ask for additional authorization to link the accounts.

Figure 7:
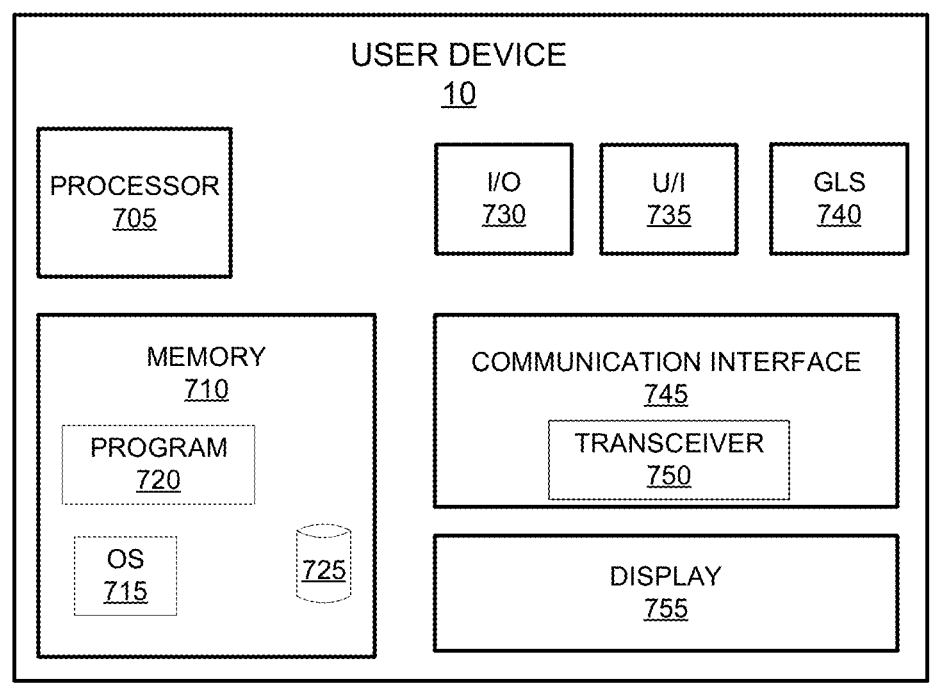
FIG. 7 is a component diagram of an example of a user device that can be used to submit a payment, in accordance with some examples of the present disclosure.

FIG. 7 is a component diagram of an example user device 10 that can be used to submit a payment, according to some examples of the present disclosure. A user device 10 can include a processor 705 similar to the processor 610 described above for the account provider system 20. The user device 10 can also include a memory 710, operating system 715, one or more programs 720, and/or data storage 725, which can be similar to the memory 615, OS 620, one or more programs 625, or database 630, respectively, as described for the account provider system 20. The user device 10 can also include a communication interface 745 that includes a transceiver 750, which can be similar to the communication interface 635 and transceiver 640 described above.

The operating system 715 can enable the user device 10 to operate the various applications described herein. A program 720, for example, may include an application associated with the account provider system 20 and/or the social media system 30. The operating system 715, for example, can operate an account provider application that enables the user device 10 to display the GUI associated with the account provider system 20. The operating system 715 can also operate a social media application that enables the user device 10 to display the GUI associated with the social media system 30.

The memory 710 can include a static RAM (SRAM) and a dynamic RAM (DRAM). The systems and methods described for using a payment handle can limit the storage requirements of the DRAM of the user device 10. If the user device 10 has a relatively low DRAM capacity, for example, the simplified checkout page can improve the performance of the user device 10 as a whole, particularly when the user device 10 is running multiple applications.

The user device 10 can also include one or more input/output ("I/O") devices 730 that can include one or more interfaces for receiving signals or input from devices and providing signals or output to one or more devices that allow data to be received and/or transmitted by the user device 10. For example, the user device 10 can include interface components, which can provide interfaces to one or more input devices, such as one or more keyboards, mouse devices, touch screens, track pads, trackballs, scroll wheels, digital cameras, microphones, sensors, and the like, that enable the user device 10 to receive data from one or more users.

The user device 10 can also include a user interface ("U/I") device 735 for receiving user input data, such as data representative of a click, a scroll, a tap, a press, or typing on an input device that can detect tactile inputs. According to some examples, U/I device 735 can include some or all of the components described with respect to I/O device 730 above. The U/I device 735 can be defined as the "input" of the user device 10.

The user device 10 can also include a geographic location sensor ("GLS") 740 for determining the geographic location of the user device 10. This information can be used, for example, by the account provider system 20 to determine if a user requesting to link the social media handle to the payment handle 810 is within a predetermined geographic location. The user can, for example, provide security preferences within the account provider system 20 that only allows the linking of accounts to be performed when the request is performed by the user device 10 within the predetermined geographic location.

The user device 10 can also include a display 755. The display 755 can provide visual representation of the various websites, applications, and/or GUIs described herein. The display 755 can also be a U/I device 735 in the case that the user device 10 has touchscreen capabilities. In other words, in some examples the display 755 can be the "input" of the user device 10.

Figure 8B:
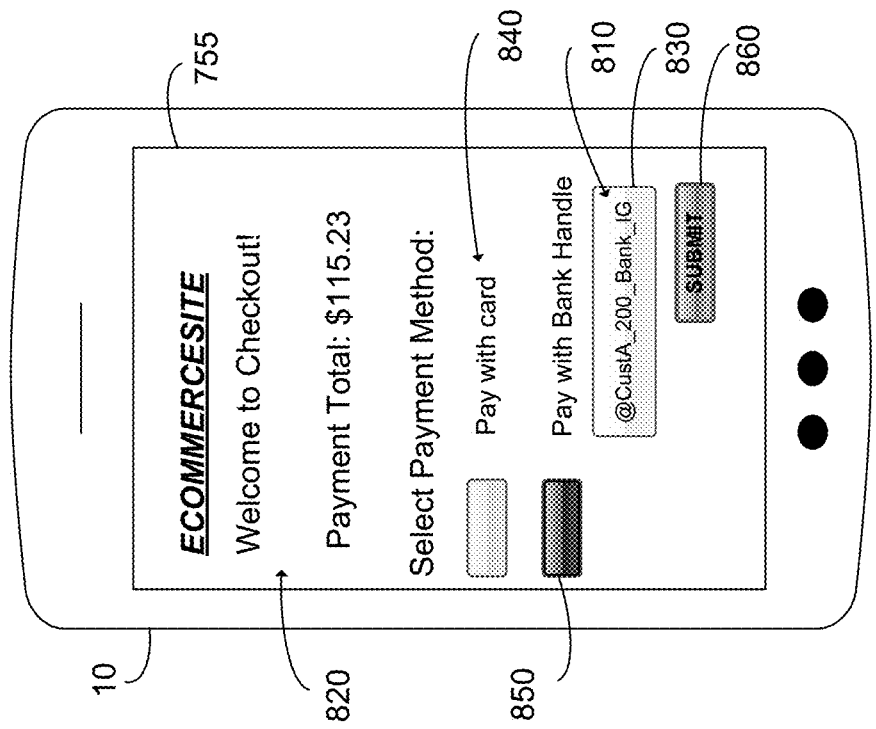
FIGS. 8A-8B are example graphical user interfaces (GUIs) that accept a payment handle at checkout, in accordance with some examples of the present disclosure.
Figure 8A:
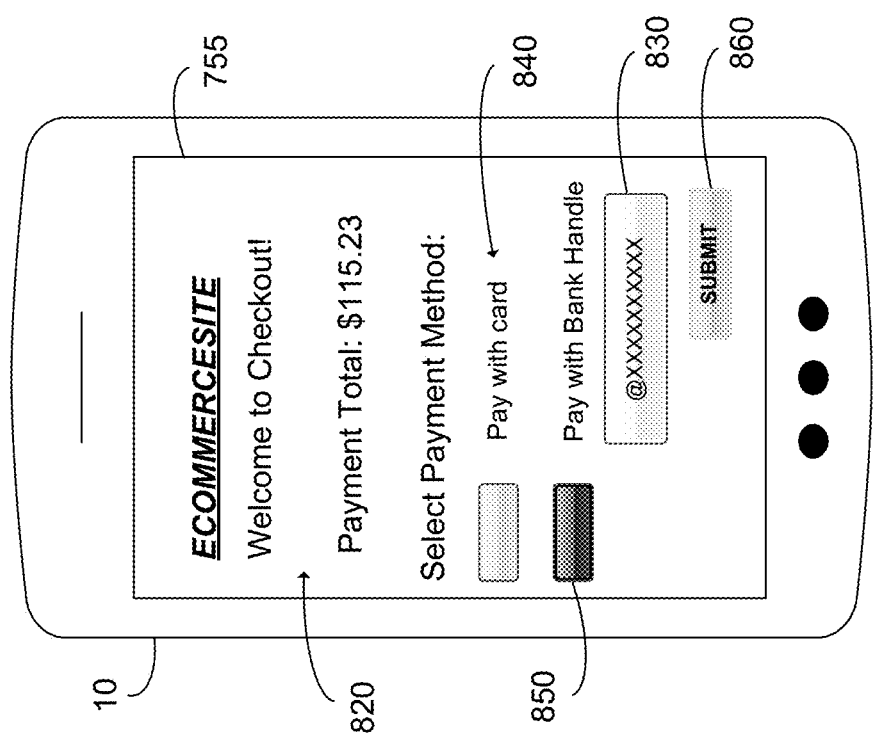

FIGS. 8A-8B are example checkout pages 820 that accept a payment handle 810, according to some examples of the present disclosure. Once a user has selected a product or service for purchase, the social media site associated with the social media system 30 can populate a checkout page 820 to present to the user on a display 755 of a user device 10. An example of a checkout page 820 is shown in FIG. 8A. The checkout page 820 can be populated with a field 830 to accept a payment handle 810. In some examples, the checkout page 820 can include an option to use legacy checkout fields, for example a "pay with card" field 840. The pay with card field 840 can remain un-populated until the legacy checkout field is selected. Accordingly, the user device 10 is not burdened with displaying the pay with card field 840 or other legacy fields unless the user expressly requests the fields. In some examples, the checkout page can omit legacy fields entirely and only provide a field 830 to enter a payment handle 810.

FIG. 8B is a checkout page 820 depicting an example process of entering a payment handle 810 to effect a payment. In some examples, the user can select to proceed by paying with a payment handle 810, for example, by selecting a radio button 850, a drop down tab, or the like. In other examples, the user can simply enter the payment handle and hit "submit," "pay," or similar. Regardless, the user can use an input of the user device 10, for example the U/I device 735 and/or display 755 (e.g., a touchscreen), to enter the payment handle 810 and select a submit button 860 to proceed with payment. FIG. 8B shows an example payment handle 810 entered into the field 830. The exemplary payment handle 810 shown corresponds to a maximum transaction amount of $200.

After hitting submit, the bulk of the work to complete the transaction is completed by backend systems at the social media system 30 and the account provider system 20. Because the method 100 obviates the need for legacy checkout pages, less data is transferred between the user device 10 and the social media system 30 to complete a transaction. Similarly, less data is transferred between the social media system 30 and the account provider system 20. Indeed, in both cases, all that is required is the payment handle and some limited information from the social media system 30 to ensure the payment handle is being used with the appropriate social media account. This reduces resource consumption (e.g., processor, memory, and network resources) by the user device 10, the account provider system 20, and the social media system 30.

As used in this disclosure, the terms "component," "module," "system," "server," "processor," "memory," and the like are intended to include one or more computer-related units, such as but not limited to hardware, firmware, a combination of hardware and software, software, or software in execution. For example, a component can be, but is not limited to being, a process running on a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Certain examples and implementations of the disclosed technology are described above with reference to block and flow diagrams of systems and methods according to example examples or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams can not necessarily need to be performed in the order presented, can be repeated, or can not necessarily need to be performed at all, according to some examples or implementations of the disclosed technology.

It is also to be understood that the mention of one or more method steps does not preclude the presence of additional method steps or intervening method steps between those steps expressly identified.

While the present disclosure has been described in connection with a plurality of exemplary aspects, as illustrated in the various figures and discussed above, it is understood that other similar aspects can be used, or modifications and additions can be made, to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

The use herein of terms such as "having," "has," "including," or "includes" are open-ended and are intended to have the same meaning as terms such as "comprising" or "comprises" and not preclude the presence of other structure, material, or acts. Similarly, though the use of terms such as "can" or "can" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

By "comprising" or "containing" or "including" it is meant that at least the named compound, element, particle, or method step is present in the composition or article or method, but does not exclude the presence of other compounds, materials, particles, method steps, even if the other such compounds, material, particles, method steps have the same function as what is named.

The components described in this disclosure as making up various elements of the systems and methods are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

Examples of the present disclosure may be implemented according to at least the following clauses:

Clause 1: A method for expediting payments, the method comprising: receiving, at a transceiver of an account provider system, a request from a user device to link a first social media account to a financial account associated with a user of the user device; receiving, at the transceiver, a first social media handle associated with the first social media account; generating, with a processor of the account provider system, a first payment handle associated with the first social media handle; sending, with the transceiver, the first payment handle to the user device; receiving, at the transceiver, a first payment request from a first social media system, the first payment request including the first payment handle; determining, with the processor, whether the first payment request was received from the first social media account; and either: when the first payment request was not received from the first social media account: denying, by the account provider system, the first payment request; and sending, with the transceiver, a denial message to the first social media system; or when the first payment request was received from the first social media account: approving, by the account provider system, the first payment request; and sending, with the transceiver, an approval message to the first social media system.

Clause 2: The method of clause 1, wherein the first social media handle and the first payment handle are different, and wherein the first payment request does not include a credit card number, a password, or an account number associated with the financial account.

Clause 3: The method of clause 1 or 2, wherein: the first payment handle is a single-use payment handle; and the method further comprises: deactivating, by the processor, the first payment handle after approving the first payment request.

Clause 4: The method of any of clauses 1 to 3, further comprising: receiving, at the transceiver, a request from the user device to link a second social media account to the first payment handle; linking, by the processor, the second social media account to the first payment handle; receiving, at the transceiver, a second payment request from a second social media system, the second payment request including the first payment handle; determining, with the processor, whether the second payment request was received from the second social media account; and either: when the second payment request was not received from the second social media account: denying, by the account provider system, the second payment request; and sending, with the transceiver, a denial message to the second social media system; or when the second payment request was received from the second social media account: approving, by the account provider system, the second payment request; and sending, with the transceiver, an approval message to the second social media system.

Clause 5: The method of any of clauses 1 to 3, further comprising: receiving, at the transceiver, a request from the user device to link a second social media account to the financial account; receiving, at the transceiver, a second social media handle associated with the second social media account; generating, with the processor, a second payment handle associated with the second social media handle; sending, with the transceiver, the second payment handle to the user device; receiving, at the transceiver, a second payment request from a second social media system, the second payment request including the second payment handle; determining, with the processor, whether the second payment request was received from the second social media account; and either: when the second payment request was not received from the second social media account: denying, by the account provider system, the second payment request; and sending, with the transceiver, a denial message to the second social media system; or when the second payment request was received from the second social media account: approving, by the account provider system, the second payment request; and sending, with the transceiver, an approval message to the second social media system;

wherein the first social media account and the second social media account are associated with different accounts; and wherein the first payment handle and the second payment handle are different handles.

Clause 6: The method of any of clauses 1 to 3, further comprising: receiving, at the transceiver, a first maximum transaction amount from the user device, the first maximum transaction amount being associated with the first payment handle; generating, via the processor, a second payment handle associated with the first social media handle; and receiving, at the transceiver, a second maximum transaction amount from the user device, the second maximum transaction amount being associated with the second payment handle; wherein the first maximum transaction amount is a higher monetary amount than the second maximum transaction amount.

Clause 7: The method of any of clauses 1 to 3, further comprising: transmitting, by the transceiver, a warning message to the user device indicating that the first payment request was not received from the first social media account; generating, with the processor, a second payment handle associated with the first social media handle; deactivating, with the processor, the first payment handle; and sending, with the transceiver, the second payment handle to the user device.

Clause 8: The method of any of the preceding clauses, further comprising: receiving, at the account provider system, an approved merchant list from the user device to associate with the first payment handle; and determining, with the processor, whether the first payment request is associated with a merchant on the approved merchant list.

Clause 9: The method of any of the preceding clauses, further comprising: receiving, at the transceiver, an approved category of goods list from the user device to associate with the first payment handle; and determining, with the processor, whether the first payment request is associated with a category of goods that is on the approved category of goods list.

Clause 10: A method of expediting a payment, the method comprising: receiving, at a transceiver of an account provider system, a log in request from a user device; generating, with a processor of the account provider system, a graphical user interface (GUI) for display on the user device, the GUI providing data for a financial account associated with a user of the user device; sending, with the transceiver, the GUI to the user device; receiving, at the transceiver, a request from the user device to link a first social media handle to the financial account; populating, with the processor, a first log in page for a first social media system for display in the GUI; sending, with the transceiver, the first log in page to the user device; receiving, at the transceiver, log in credentials from the user device for a first social media account associated with the first social media handle; communicating, by the transceiver, with the first social media system; receiving, at the transceiver, social media account information from the first social media system; generating, with the processor, a first payment handle associated with the first social media handle; and sending, with the transceiver, the first payment handle to the user device to be used for payment authorization within the first social media system.

Clause 11: The method of clause 10, further comprising: receiving, at the transceiver, a request from the user device to link a second social media handle to the financial account; populating, with the processor, a second log in page for a second social media system for display in the GUI; sending, with the transceiver, the second log in page to the user device; receiving, at the transceiver, log in credentials for a second social media account associated with the second social media handle; communicating, by the transceiver, with the second social media system; receiving, at the transceiver, social media account information from the second social media system; generating, with the processor, a second payment handle associated with the second social media handle; and sending, with the transceiver, the second payment handle to the user device to be used for payment authorization within the second social media system.

Clause 12: The method of clause 10 or 11, further comprising: receiving, at the transceiver, a first maximum transaction amount from the user device, the first maximum transaction amount being associated with the first payment handle; generating, with the processor, a second payment handle associated with the first social media handle; and receiving, at the transceiver, a second maximum transaction amount from the user device, the second maximum transaction amount being associated with the second payment handle; wherein the first maximum transaction amount is a higher monetary amount than the second maximum transaction amount.

Clause 13: The method of any of clauses 10 to 12, further comprising: receiving, at the transceiver, an approved merchant list from the user device to associate with the first payment handle.

Clause 14: The method of any of clauses 10 to 13, further comprising: receiving, at the transceiver, an approved category of goods list from the user device to associate with the first payment handle.

Clause 15: The method of any of clauses 10 to 14, wherein: the account provider system communicates with the first social media system via an application programming interface (API) that establishes a link between the account provider system and the first social media system; the API filters the social media account information to include only a first portion of the social media account information; and the first portion of the social media account information comprises at least one of the first social media handle, user identification information, or user location information.

Clause 16: The method of any of clauses 10 to 15, further comprising: transmitting, by the transceiver, a consent notification to the user device requesting approval to link the first payment handle with the first social media handle; wherein the consent notification is transmitted via short message service or e-mail.

Clause 17: The method of any of clauses 10 to 16, further comprising: receiving, at the transceiver, a payment request from the first social media system, the payment request including the first payment handle; determining, with the processor, whether the payment request was received from the first social media account; and either: when the payment request was not received from the first social media account: denying, by the account provider system, the payment request; and sending, with the transceiver, a denial message to the first social media system; or when the payment request was received from the first social media account: approving, by the account provider system, the payment request; and sending, with the transceiver, an approval message to the first social media system; wherein the payment request does not include a credit card number, a password, or an account number associated with the financial account.

Clause 18: The method of clause 17, further comprising: transmitting, by the transceiver, a warning message to the user device indicating that the payment request was not received from the first social media account; generating, with the processor, a second payment handle associated with the first social media handle; deactivating, with the processor, the first payment handle; and sending, with the transceiver, the second payment handle to the user device.

Clause 19: A user device comprising: a display including a graphical user interface (GUI); a transceiver to send and receive wired and wireless communications; one or more processors; and a memory in communication with the display and the one or more processors and storing instructions that, when executed by the one or more processors, cause the user device to: receive, at an input of the user device, a request from a user to log into an account provider system; receive, at the input, a request to link a first social media account to a financial account; display, on the GUI, a log in page for a first social media system associated with the first social media account; receive, at the input, log in credentials for the first social media account; receive, at the transceiver, a first payment handle from the account provider system, the first payment handle being linked to (1) the financial account and (2) a first social media handle associated with the first social media account; display, on the GUI, a first checkout page associated with the first social media system, the first checkout page comprising a first field for inputting the first payment handle; and receive, at the input, the first payment handle to approve a first payment request.

Clause 20: The user device of clause 19, wherein the instructions further cause the user device to: receive, at the input, a request to link a second social media account to the financial account; display, on the GUI, a log in page for a second social media system associated with the second social media account; receive, at the input, log in credentials for the second social media account; receive, at the transceiver, a second payment handle from the account provider system, the second payment handle being linked to (1) the financial account and (2) a second social media handle associated with the second social media account; display, on the GUI, a second checkout page associated with the second social media system, the second checkout page comprising a second field for inputting the second payment handle; and receive, at the input, the second payment handle to approve a second payment request; wherein the first social media account and the second social media account are associated with different accounts; and wherein the first payment handle and the second payment handle are different.

Exemplary Use Cases

The following exemplary use cases describe examples of a typical user flow pattern. They are intended solely for explanatory purposes and not limitation.

Social media user, Customer A, wishes to simplify the process of paying for goods on her favorite social media site, Instagram®. Customer A can use her user device 10, a smart phone, to log into her account provider system 20 via an application running on the smart phone. After providing log in credentials to access her financial account, Customer A can proceed to her account information stored in the account provider system 20. The account provider system 20 can have a log-in site for Instagram® embedded within the GUI for Customer A's financial account. Customer A can then enter her login credentials for Instagram®, including her password, phone number, email address, social media handle, or other relevant information. In this example, Customer A's social media handle is @Customer A_123.

The account provider system 20 can then have access to Customer A's social media handle for Instagram®. A processor (e.g., processor 610) can then generate a payment handle 810 for Customer A to use within Instagram®. The payment handle 810 provided to Customer A is @CustA_Bank_IG_12. In some examples, Customer A can customize the payment handle 810 to make it easier to remember, more secure, etc.

Customer A can then log into the Instagram® website or application and find a product she wishes to purchase. The social media system 30 can then take Customer A to a checkout page 820 that includes a field 830 to enter her payment handle 810 and a choice to choose a legacy checkout page. Without needing to enter credit card information or provide an account and password for a third-party system, Customer A can simply enter her payment handle 810 into the field 830 and press submit. Customer A's smart phone did not have to store account information, automatically populate account information, populate multiple checkout fields, or send the data associated with these fields; thus, saving memory and processing resources for her device. Similarly, Instagram® did not have to provide a legacy checkout page or receive and process the extra data associated therewith.

Later, Customer A wishes she had placed a limit on the amount of money that she could spend on Instagram®. So, she signs back in to the account provider system 20, accesses her saved payment handles, and configures her payment handle 810 to have a maximum transaction amount of $200. The account provider system 20 can then generate a new payment handle 810, e.g., @CustA_200_Bank_IG, to use for purchases. Alternatively, Customer A could ask for a new payment handle 810 to have in addition to her first payment handle 810, one with a maximum transaction amount and one with an unlimited transaction amount.

In this example, Customer A is also a user of Twitter® and wishes to have a payment handle dedicated to that social media site. Customer A can log back in to her financial account, access a log-in site for Twitter® embedded within the GUI for Customer A's financial account, and link her financial account with her Twitter® handle. The account provider system 20 can then generate a new payment handle 810, for example @CustA_Bank_TW_12, to use in Twitter®. If Customer A signs in to Twitter® and uses her payment handle 810 associated with her Instagram® account, the account provider system 20 can deny the payment request and send a warning message to her smart phone indicating that the payment request was not received from the linked social media account. Alternatively, the account provider system 20 can send a denial message to Twitter®, and Twitter® can inform Customer A of the payment failure. Customer A can then reattempt her payment with the proper, linked payment handle.

In another example, Customer A may wish to use a single payment handle 810 on both Twitter® and Instagram®. In this case, she signs back in to the account provider system 20, accesses her saved payment handles, and configures her @CustA_Bank_IG_12 payment handle 810 to work on both social media sites. In some examples, she may also choose to rename the payment handle 810 to reflect this multi-site use by renaming the handle to be more generic, e.g., @CustA_Bank_12. She can then enter this payment handle 810 in the checkout page 820 of both Twitter® and Instagram® to make a payment.

What is claimed is:

1. A method for expediting payments, the method comprising:
receiving, at a first processor of a social media system, a login request from a user device to log into a social media account, the login request comprising a social media handle for a user;

receiving, at the first processor, a link request to link the social media handle with a financial account associated with the user, the social media handle comprising a first readable string of characters;

transmitting, via a transceiver associated with the social media system, a link notification to an account provider system indicating the user wishes to link the social media handle with the financial account, the link notification comprising the social media handle;

generating, at a second processor associated with the account provider system, a first payment handle comprising a second readable string of characters, at least a first portion of the second readable string of characters comprising at least a predetermined portion of the first readable string of characters of the social media handle, at least a second portion of the second readable string of characters comprising a first identifier for a category of a first product or service, and a length of the first payment handle being customizable based on the user's security preferences;

receiving, via a graphical user interface (GUI) associated with the social media system, a first purchase request to purchase the first product or service associated with a first merchant other than the social media system;

generating, via the GUI and in response to receiving the first purchase request, a checkout page to purchase the first product or service, the checkout page comprising a handle field configured to receive the first payment handle generated by the account provider system and associated with the financial account, the first payment handle comprising the second readable string of characters insertable into the handle field;

receiving, at the first processor and via the handle field of the GUI, the first payment handle from the user device;

transmitting, via the transceiver and in response to receiving the first payment handle from the user device, a first payment request to the account provider system comprising the first payment handle and a cost associated with the first product or service;

determining, with the second processor, whether the first payment request was received from the social media account within the social media system;

generating, with the second processor, a first approval of the first payment request if (i) the first payment handle is linked to the social media handle, (ii) the financial account contains at least a first monetary amount equal to the costs associated with the first product or service, and (iii) the first payment request was received from the social media account within the social media system;

receiving, at the first processor, the first approval of the first payment request from the account provider system; and transmitting, with the transceiver, the first monetary amount to a first merchant system associated with the first merchant to pay for the first product or service.

2. The method of claim 1, wherein generating the checkout page comprises receiving, via the GUI, an indication that the user wishes to populate the handle field for the first payment handle, the indication comprising a selection of a radio button associated with the handle field.

3. The method of claim 2, wherein the checkout page consists of the handle field.

4. The method of claim 1, wherein the first payment request does not comprise a credit card number, a password, or an account number associated with the financial account.

5. The method of claim 1, further comprising:
generating, at the second processor of the account provider system, a second payment handle comprising a third readable string of characters, at least a first portion of the third readable string of characters comprising at least a predetermined portion of the first readable string of characters of the social media handle, and at least a second portion of the third readable string of characters comprising a second identifier for a category of a second product or service;

receiving, via the GUI, a second purchase request to purchase the second product or service associated with a second merchant other than the social media system;

generating, via the GUI and in response to receiving the second purchase request, the checkout page to purchase the second product or service, the checkout page comprising the handle field configured to receive the second payment handle generated by the account provider system and associated with the financial account, the second payment handle comprising the third readable string of characters insertable into the handle field;

receiving, at the first processor and via the handle field of the GUI, the second payment handle from the user device;

transmitting, via the transceiver and in response to receiving the second payment handle from the user device, a second payment request to the account provider system comprising the second payment handle and a cost associated with the second product or service;

receiving, at the first processor, a second approval of the second payment request from the account provider system, the second approval indicating that the second payment handle is linked to the social media handle and that the financial account contains at least a second monetary amount equal to the costs associated with the second product or service; and transmitting, with the transceiver, the second monetary amount to a second merchant system associated with the second merchant to pay for the second product or service.

6. The method of claim 5, wherein the first payment handle is limited for use with the first merchant, and the second payment handle is limited for use with the second merchant.

7. The method of claim 5, wherein the first payment handle and the second payment handle are different strings of characters insertable into the handle field.

8. The method of claim 7, wherein:
the first payment handle and the second payment handle each begin with a prefix symbol and comprise a plurality of letters, numbers, or special characters following the prefix symbol; and
the prefix symbol and plurality of letters, numbers, or special characters are readable within the handle field of the GUI.

9. The method of claim 1, wherein:
the first payment handle begins with a prefix symbol and comprise a plurality of letters, numbers, or special characters following the prefix symbol; and
the prefix symbol and plurality of letters, numbers, or special characters are readable within the handle field of the GUI.

10. The method of claim 1, wherein the first payment handle is only valid for a single login session and expires upon the user logging out of the social media account.

11. The method of claim 1, wherein the checkout page further comprises a password field configured to receive a password for the user's social media account.

12. A system comprising:
an account provider system comprising:
one or more first processors; and
a first memory in communication with the one or more first processors and storing instructions that, when executed by the one or more first processors, cause the account provider system to:
receive a link notification from a social media system to link a social media handle with a financial account associated with a user, the social media handle comprising a first readable string of characters; and
generate a first payment handle comprising a second readable string of characters, at least a first portion of the second readable string of characters comprising at least a predetermined portion of the first readable string of characters of the social media handle, at least a second portion of the second readable string of characters comprising an identifier for a category of a first product or service, and a length of the first payment handle being customizable based on the user's security preferences; and
a social media system comprising:
a transceiver configured to send and receive wired or wireless communications;
one or more second processors; and
a second memory in communication with the one or more second processors and storing instructions that, when executed by the one or more second processors, cause the social media system to:
receive a login request from a user device to log into a social media account, the login request comprising the social media handle for the user;
receive a link request to link the social media handle with the financial account associated with the user;
transmit a link notification to an account provider system indicating the user wishes to link the social media handle with the financial account, the link notification comprising the social media handle;
receive, via a graphical user interface (GUI), a first purchase request to purchase the first product or service associated with a first merchant;
generate, via the GUI, a checkout page to purchase the first product or service, the checkout page comprising a handle field configured to receive the first payment handle generated by the account provider system and associated with the financial account, the first payment handle comprising the second readable string of characters insertable into the handle field;
receive, via the handle field of the GUI, the first payment handle from the user device;
transmit, in response to receiving the first payment handle from the user device, a first payment request to the account provider system comprising the first payment handle and a cost associated with the first product or service;
receive a first approval of the first payment request from the account provider system; and
transmit the first monetary amount to a first merchant system associated with the first merchant to pay for the first product or service,
wherein the instructions, when executed by the one or more first processors, further cause the account provider system to:

determine whether the first payment request was received from the social media account within the social media system; and
generate the first approval of the first payment request if (i) the first payment handle is linked to the social media handle, (ii) the financial account contains at least a first monetary amount equal to the costs associated with the first product or service, and (iii) the first payment request was received from the social media account within the social media system.

13. The system of claim 12, wherein, to generating the checkout page, the instructions further cause the social media system to receive, via the GUI, an indication that the user wishes to populate the handle field for the first payment handle, the indication comprising a selection of a radio button associated with the handle field.

14. The system of claim 13, wherein the checkout page consists of the handle field.

15. The system of claim 12, wherein the first payment request does not comprise a credit card number, a password, or an account number associated with the financial account.

16. The system of claim 12, wherein:
the instructions, when executed by the one or more first processors, further cause the account provider system to generate a second payment handle comprising a third readable string of characters, at least a first portion of the third readable string of characters comprising at least a predetermined portion of the first readable string of characters of the social media handle, and at least a second portion of the third readable string of characters comprising a second identifier for a category of a second product or service; and
the instructions, when executed by the one or more second processors, further cause the social media system to:
receive, via the GUI, a second purchase request to purchase the second product or service associated with a second merchant;
generate, via the GUI and in response to receiving the second purchase request, the checkout page to purchase the second product or service, the checkout page comprising the handle field configured to receive a second payment handle generated by the account provider system and associated with the financial account, the second payment handle comprising the third readable string of characters insertable into the handle field;
receive, via the handle field of the GUI, the second payment handle from the user device;
transmit, in response to receiving the second payment handle from the user device, a second payment request to the account provider system comprising the second payment handle and a cost associated with the second product or service;
receive a second approval of the second payment request from the account provider system, the second approval indicating that the second payment handle is linked to the social media handle and that the financial account contains at least a second monetary amount equal to the costs associated with the second product or service; and
transmit the second monetary amount to a second merchant system associated with the second merchant to pay for the second product or service.

17. The system of claim 16, wherein the first payment handle is limited for use with the first merchant, and the second payment handle is limited for use with the second merchant.

18. The system of claim 16, wherein the first payment handle and the second payment handle are different strings of characters insertable into the handle field.

19. The system of claim 18, wherein:
- the first payment handle and the second payment handle each begin with a prefix symbol and comprise a plurality of letters, numbers, or special characters following the prefix symbol; and
- the prefix symbol and plurality of letters, numbers, or special characters are readable within the handle field of the GUI.

20. The system of claim 12, wherein:
- the first payment handle begins with a prefix symbol and comprises a plurality of letters, numbers, or special characters following the prefix symbol; and
- the prefix symbol and plurality of letters, numbers, or special characters are readable within the handle field of the GUI.

\* \* \* \* \*